US011308188B2

(12) United States Patent
Moulin et al.

(10) Patent No.: US 11,308,188 B2
(45) Date of Patent: *Apr. 19, 2022

(54) METHOD USED IN A MOBILE EQUIPMENT WITH A TRUSTED EXECUTION ENVIRONMENT FOR AUTHENTICATING A USER BASED ON HIS FACE

(71) Applicant: KeyLemon S.A., Martigny (CH)

(72) Inventors: Francois Moulin, Volleges (CH); Alain Fogel, Eglharting (DE)

(73) Assignee: KeyLemon S.A, Martigny (CH)

( * ) Notice: Subject to any disclaimer, the term of this patent is extended or adjusted under 35 U.S.C. 154(b) by 747 days.

This patent is subject to a terminal disclaimer.

(21) Appl. No.: 16/233,832

(22) Filed: Dec. 27, 2018

(65) Prior Publication Data
US 2019/0205517 A1   Jul. 4, 2019

(30) Foreign Application Priority Data

Dec. 29, 2017  (EP) ..................................... 17211226

(51) Int. Cl.
| | |
|---|---|
| G06F 7/04 | (2006.01) |
| G06F 21/32 | (2013.01) |
| G06N 3/02 | (2006.01) |
| G06F 21/53 | (2013.01) |
| G06V 30/194 | (2022.01) |
| G06V 40/16 | (2022.01) |

(52) U.S. Cl.
CPC .............. *G06F 21/32* (2013.01); *G06F 21/53* (2013.01); *G06N 3/02* (2013.01); *G06V 30/194* (2022.01); *G06V 40/172* (2022.01)

(58) Field of Classification Search
CPC ......................................................... G06F 7/04
See application file for complete search history.

(56) References Cited

U.S. PATENT DOCUMENTS

| | | | |
|---|---|---|---|
| 2009/0074259 A1* | 3/2009 | Baltatu .............. | G06K 9/00288 382/118 |
| 2013/0225129 A1* | 8/2013 | Norbisrath .......... | H04W 12/065 455/411 |
| 2016/0110590 A1* | 4/2016 | Yi ...................... | G06K 9/00986 382/118 |
| 2016/0328621 A1* | 11/2016 | Negi .................... | G06K 9/4604 |

* cited by examiner

*Primary Examiner* — Olisa Anwah
(74) *Attorney, Agent, or Firm* — Michael Best & Friedrich LLP

(57) ABSTRACT

A method used in a mobile equipment for authenticating or identifying a user based on his face includes acquiring at least one biometric face sample corresponding to at least one image frame of the user in a Trusted Execution Environment of the mobile equipment, transmitting the biometric face sample to a Rich Execution Environment of the mobile equipment, and classifying at least one portion of the biometric face sample using a classifier in the Rich Execution Environment, so as to generate a set of intermediary outputs and preferably a classification result. The method further includes sending at least some of the intermediary outputs to the Trusted Execution Environment, and verifying at least some of the intermediary outputs in the Trusted Execution Environment.

16 Claims, No Drawings

METHOD USED IN A MOBILE EQUIPMENT WITH A TRUSTED EXECUTION ENVIRONMENT FOR AUTHENTICATING A USER BASED ON HIS FACE

CROSS-REFERENCE TO RELATED APPLICATIONS

This application claims the benefit of priority of European Patent Application No. 17211226, filed on Dec. 29, 2017, which is incorporated herein by reference in its entirety.

FIELD OF THE DISCLOSURE

The present invention is related with the execution of face processing software in mobile equipment such as smartphones, tablets, laptops, webcams and the like.

BACKGROUND

Mobile equipment often use processors with two environments for the execution of programs, one user-facing environment in which most applications run in an operating system such as Android, iOS, Windows, etc, and another isolated environment that runs in parallel with this operating system, and which guarantees that code and data loaded inside to be protected with respect to confidentiality and integrity. The user-facing environment is often called the Rich Execution Environment (REE) while the secure execution environment is called the Trusted Execution Environment (TEE). TEE are defined by the Open Mobile Terminal Platform (OMTP) in the 'Advanced Trusted Environment: OMTP TR1' version 1.1 standard, which is incorporated herein by reference.

As an example, some ARM processors have a TrustZone as a specific implementation of a TEE.

In some devices, software executed in the TEE can use only one single core of the main processor, while software executed in the REE can access more cores, and/or additional hardware processing modules such as a graphic processor, a neural network and the like. Frequently, the REE has also access to more memory than the TEE. In some devices, some sensors, like a fingerprint sensor, a camera etc can only be accessed from the TEE.

Generally, software executed in the TEE is more secure but slower than software executed in the REE.

The separation between the trusted and Rich Execution Environment can be done via a physical separation of CPU's, GPU, memories, drivers etc and/or by time-sharing the CPU and/or other components.

In some implementations, a single bit (the "non-secure bit) in a secure configuration register indicates whether a module has access to the resources of the TEE or to the resources of the REE.

It is usually possible to communicate between the two environments.

Software for which security is crucial are often run entirely in the TEE. For example, some mobile equipment comprises a fingerprint authentication feature for authenticating the user of the device with his fingerprints that are captured with a fingerprint sensor in order to unlock the device. The module frequently comprises fingerprint sensor drivers, a fingerprint database, fingerprint user applications, etc which are entirely executed in the Trusted Execution Environment, so that the authentication can not be compromised.

Apart from fingerprints, user authentication based on face recognition is becoming increasingly popular on mobile equipment. The combination of non-intrusiveness, small surface requirement, and no need to contact the device makes it more and more prevalent on smartphones, among others. However, the computing power that is required to achieve an accurate and high confidence recognition is very high, so that executing face recognition software in the Trusted Execution Environment of many mobile equipment leads to unacceptable recognition time.

The computing and memory requirements are especially high for 3D face recognition, i.e. when the recognition is based on 3D sensors, often in addition to a visible light and to an infrared sensor. Although 3D face recognition improves the reliability of the face recognition, it also generates biometric samples with more information than conventional 2D face recognition, and thus requires a more complex classifier, for example a neural network with more inputs and often more layers, in order to match the biometric samples with reference images. A fast classification of 3D face images, for example in order to unlock a mobile equipment, requires a neural network, a graphic processor and/or additional cores of the CPU which are usually not available from the Trusted Execution Environment.

SUMMARY

In some implementations, the foregoing drawbacks are avoided, and the present disclosure allows a fast and secure execution of face recognition software and drivers in mobile equipment.

According to some implementations, these aims can be achieved by a method used in a mobile equipment for authenticating or identifying a user based on his face, comprising:
  acquiring at least one biometric sample corresponding to at least one image frame of the user in a Trusted Execution Environment of the mobile equipment;
  transmitting said biometric sample to a Rich Execution Environment of the mobile equipment;
  classifying at least one portion of the biometric sample using a classifier in the Rich Execution Environment, so as to generate a set of intermediary outputs and preferably a classification result;
  sending at least some of the intermediary outputs to the Trusted Execution Environment;
  verifying at least some of the intermediary outputs in said Trusted Execution Environment.

The idea is to use, as much as possible, the computing power of the Rich Execution Environment while preserving the security of the computation even if the Rich Execution Environment is compromised.

According to one aspect, the regular processing that is required for face authentication is performed at least partially in the Rich Execution Environment, and a verification of the results is performed in the Trusted Execution Environment, so that hacks can be detected.

The verification is performed on a subset of the intermediary outputs that are computed, for example on a randomly selected subset of the intermediary outputs that are computed from one biometric sample of from one region. Thus, not all the information in a frame or region that is used for authentication is used for the verification.

Other aspects, features and advantages will be readily apparent form the following detailed description, and the claims.

DETAILED DESCRIPTION OF EXAMPLE EMBODIMENTS

We assume that the face recognition method that we want to execute is composed of a list of steps, each step takes several inputs and returns several outputs that are used as input for the next step. The idea in some implementations includes the following:

1. Retrieve biometric face samples in the Trusted Execution Environment. Each biometric face sample can be obtained by pre-processing one image frame in a stream of images received from one or a plurality of image sensors, for example a RGB sensor, a near-infrared sensor, and a depth sensor, and transmitting those images over DMA to a memory of the TEE.
2. Send the biometric face sample to the Rich Execution Environment.
3. Classify the biometric face sample in the Rich Execution Environment and keep the intermediary outputs of at least some of the execution steps.
4. Send the result (if available) and the intermediary outputs to the Trusted Execution Environment.
5. In the Trusted Execution Environment, verify at least some of said intermediary outputs by computing the value from the input. The outputs that are verified are chosen randomly using a random generator located inside the Trusted Execution Environment.
6. If there is a difference between the intermediary outputs or results computed in the REE and the corresponding values available in the TEE, refuse the user authentication.

In case of face recognition, in some instances, we only are interested to validate positive matches. If the Rich Execution Environment does not recognize the face, we don't need to validate the result since preventing the user to be authenticated is not a security risk. Therefore, in one embodiment, only positive matching results (when a user has been authenticated) and the corresponding intermediary outputs are sent to the Trusted Execution Environment, and verified. Alternatively, all results and corresponding intermediary outputs are sent to the Trusted Execution Environment, in which only positive matching results and corresponding intermediary outputs are verified.

Face recognition comprises two main steps: the face detection and the face matching. The goal of the face detection is to find the bounding box of the face in an image and to detect some facial landmarks of faces (e.g., eyes, mouth, nose). Face detection is usually resolved by scanning the input image for faces, i.e. by splitting the image into regions and classifying each region as a face or not.

In some embodiments, the face detection is performed in the Rich Execution Environment, and verified in the Trusted Execution Environment. Preferably, only positive results are verified (i.e., i.e., when the user has been authenticated or identified), i.e. the software in the TEE only verifies the presence of faces in regions identified by the program in the REE.

According to another aspect, the face matching is performed only in the REE in regions where a face has been previously detected. The positive results are then verified in the TEE that only verifies regions in which a face has been detected and in which a user has been authenticated in the REE.

The face matching can use a classifier, for example a neural network, for classifying a frame or a region of a frame in which a face has been previously detected and for indicating whether this frame or regions corresponds to a reference model of the user one wants to authenticate. The neural network comprises typically several layers, each layer computing intermediary outputs that are used as inputs for the neurons of the next layer. In some embodiments, the classification uses a neural network in the Rich Execution Environment that delivers outputs, and possibly a final classification result, to the Trusted Execution Environment.

The Trusted Execution Environment can comprise a neural network which is equivalent to the neural network in the Rich Execution Environment, as will be described. It validates the result (if any) and at least some of the outputs received from the Rich Execution Environment, by recomputing this result and some of the intermediary outputs in order to verify that the results are correct and have not been hacked.

In some embodiments, only a subset of the intermediary outputs are verified in the Trusted Execution Environment, for example more than 10 outputs but less than 20%, preferably less than 10% of all intermediary outputs that are transmitted to the Trusted Execution Environment. The selection of outputs that are verified is preferably based on a random generator in the Trusted Execution Environment, and changes for every frame or region that is verified, or at least on a regular basis, so that a hacker having compromised the Rich Execution Environment cannot predict which outputs will be verified.

Therefore, the processing power that is needed in the Trusted Execution Environment is reduced since only regions of images in which a face has been detected and authenticated are verified, and only a random subset of the intermediary outputs for those regions are recomputed and verified.

A neural network used for 3D face authentication typically comprises a large number of inputs, and several layers. Most of the computing power and memory is required by the first layers of the network, in particular by the first layer. Therefore, in one embodiment, only one or some of the first layer(s) of the neural network classifier are computed in the Rich Execution Environment and verified in the Trusted Execution Environment; the output layer(s) of the neural networks are directly computed in the Trusted Execution Environment.

The method also can comprise a step of pre-processing the images received from the image sensors, and to correct the illumination, contrast, white balance, remove shadows, crops less interesting regions, etc. the pre-processing is preferably performed in the Trusted Execution Environment, to avoid any hack during this pre-processing. Alternatively, some steps of pre-processing can be executed in the Rich Execution Environment, for example in order to access a graphical processor or a DSP or additional cores in the Rich Execution Environment. If those steps are critical, the correct execution can be validated by re-computing a subset in the Trusted Execution Environment.

The computations which are first done in the Rich Execution Environment and then verified in the Trusted Execution Environment use equivalent neural networks or equivalent portions of neural networks. "Equivalent" means in this context that the neural networks or portions of neural networks have the same structure (same number of neurons in each layer; same interconnections between neurons) and have been programmed during enrolment to have the same weights in all duplicated neurons, so that a same input will deliver the same intermediary outputs or results. However, the neural networks might be based on different hardware and/or software; for example, the neural network in the Rich Execution Environment might use a hardware based neural network, such as a dedicated processor or library, while the neural network in the Trusted Execution Environment might be based on software executed by a general-purpose processor.

The method also can comprise a user presence detection step, performed before the face detection that is only executed if a user is actually in front of the equipment. The presence detection is not a security critical step and can be executed in the Rich Execution Environment. Alternatively, it can be executed in the Trusted Execution Environment.

The above described method also can be used for identifying users based on their face.

Other implementations are within the scope of the claims.

What is claimed is:

1. A method used in a mobile equipment for authenticating or identifying a user based on his face, the method comprising:
    acquiring at least one biometric face sample corresponding to at least one image frame of the user in a Trusted Execution Environment of the mobile equipment;
    transmitting said biometric face sample to a Rich Execution Environment of the mobile equipment;
    classifying at least one portion of the biometric face sample using a classifier in the Rich Execution Environment, so as to generate a set of intermediary outputs and preferably a classification result;
    sending at least some of the intermediary outputs to the Trusted Execution Environment; and
    verifying at least some of the intermediary outputs in said Trusted Execution Environment.

2. The method of claim 1, wherein intermediary outputs are only verified for biometric face samples or portions of biometric face samples when said classifiers delivers a positive result.

3. The method of claim 1, wherein said Rich Execution Environment has more processing cores or graphic units or hardware neural networks than said Trusted Execution Environment.

4. The method of claim 1, wherein said classifier comprises a neural network and wherein said intermediary outputs comprise some of the intermediary outputs of said neural network.

5. The method of claim 4, wherein only one or more first layers of the neural network are computed in the Rich Execution Environment, while at least one last layer is only computed in the Trusted Execution Environment.

6. The method of claim 4, wherein the at least some of the intermediary outputs are verified in the Trusted Execution Environment with a neural network equivalent to the one used in the Rich Execution Environment for computing the intermediary outputs.

7. The method of claim 1, wherein only biometric face samples corresponding to regions of images in which a face has been authenticated are verified in said Rich Execution Environment.

8. The method of claim 1 wherein only a subset of said intermediary outputs computed for a given biometric sample or region in said Trusted Execution Environment is then verified in the Trusted Execution Environment.

9. The method of claim 8, wherein said intermediary outputs which are verified in said Trusted Execution Environment are randomly selected in said Trusted Execution Environment.

10. The method of claim 1, comprising a face detection step for detecting portions of images including a face.

11. The method of claim 10, wherein said face detection is performed in the Rich Execution Environment and verified in the Trusted Execution Environment.

12. The method of claim 11, wherein only biometric face samples corresponding to regions of images in which a face has been detected are verified in said Rich Execution Environment.

13. The method of claim 1 comprising pre-processing said image frame in order to obtain said biometric face sample.

14. The method of claim 1, comprising unlocking said mobile equipment as soon as said user has been authenticated.

15. The method of claim 14, comprising:
    a) acquiring a stream of image frames with at least one image sensor in said Trusted Execution Environment, said image frames comprising at least one 3D image;
    b) performing the method of claim 1 on a biometric sample corresponding to one image frame or to one region of an image frame where a face has been detected;
    c) repeating b) until the user has been authenticated from one of said frames or regions.

16. A mobile equipment comprising:
    a processor including a Trusted Execution Environment and a Rich Execution Environment, and
    an electronic memory storing a program for causing said processor to perform the method of claim 1.

* * * * *